US00RE41560E

(19) United States
(12) Reissued Patent
Miller et al.

(10) Patent Number: US RE41,560 E
(45) Date of Reissued Patent: Aug. 24, 2010

(54) AUTOMOTIVE CLOSURE PANEL WITH PIVOT-MOUNTED ALIGNMENT SYSTEM

(75) Inventors: Scott G. Miller, Canton, MI (US); Jeff A. Firzlaff, Royal Oak, MI (US)

(73) Assignee: Ford Global Technologies, LLC, Dearborn, MI (US)

(21) Appl. No.: 11/483,382

(22) Filed: Jul. 6, 2006

Related U.S. Patent Documents

Reissue of:
(64) Patent No.: 6,905,156
Issued: Jun. 14, 2005
Appl. No.: 10/710,142
Filed: Jun. 22, 2004

U.S. Applications:

(63) Continuation-in-part of application No. 10/604,331, filed on Jul. 11, 2003, now Pat. No. 6,793,263, which is a continuation of application No. 10/604,075, filed on Jun. 25, 2003, now Pat. No. 6,769,729.

(51) Int. Cl.
*B62D 33/023* (2006.01)

(52) U.S. Cl. ..... 296/50; 296/57.1; 296/146.11; 16/308; 16/49; 49/386

(58) Field of Classification Search ..... 296/50, 296/57.1, 146.8, 146.11, 60; 16/306, 307, 16/308; 49/386
See application file for complete search history.

(56) References Cited

U.S. PATENT DOCUMENTS

| | | | | | |
|---|---|---|---|---|---|
| 2,984,517 | A | | 5/1961 | Farrow et al. | |
| 3,031,225 | A | * | 4/1962 | Saffer et al. | 296/57.1 |
| 3,166,783 | A | | 1/1965 | Mackie et al. | |
| 3,336,070 | A | | 8/1967 | Jackson | |
| 3,656,801 | A | | 4/1972 | Doutt et al. | 296/57.1 |
| 4,143,904 | A | | 3/1979 | Cooper et al. | |
| 5,358,301 | A | * | 10/1994 | Konchan et al. | 296/146.1 |
| 5,988,724 | A | * | 11/1999 | Wolda | 296/57.1 |
| 6,637,796 | B1 | * | 10/2003 | Westerdale et al. | 296/57.1 |
| 6,773,047 | B2 | * | 8/2004 | Gruber | 296/57.1 |
| 6,796,592 | B1 | | 9/2004 | Austin | 296/57.1 |
| 2004/0178651 | A1 | * | 9/2004 | Austin | 296/57.1 |
| 2004/0262938 | A1 | * | 12/2004 | Bruford et al. | 296/50 |

* cited by examiner

*Primary Examiner*—Kiran B. Patel
(74) *Attorney, Agent, or Firm*—Damian Porcari; Alleman Hall McCoy Russell & Tuttle LLP

(57) ABSTRACT

An automotive closure panel which is rotatable about a pivot axis has an axial locator insert situated within a pivot bearing insert bore to set a margin extending between the closure panel and a vehicle body. This system is particularly useful for closure panels such as tailgates having torsion bar or motorized lift assist, because such systems are not easily disassembled for the purpose of setting the closure panel margins.

31 Claims, 4 Drawing Sheets

AUTOMOTIVE CLOSURE PANEL WITH PIVOT-MOUNTED ALIGNMENT SYSTEM

Matter enclosed in heavy brackets [ ] appears in the original patent but forms no part of this reissue specification; matter printed in italics indicates the additions made by reissue.

This Application is a continuation-in-part of Ser. No. 10/604,331, filed Jul. 11, 2003 U.S. Pat. No. 6,793,263, entitled "Pickup Truck With Lift Assisted Tailgate System", which is a continuation in part of Ser. No. 10/604,075, filed Jun. 25, 2003 U.S. Pat. No. 6,769,729, entitled "Automotive Tailgate with Lift Assist System-I".

BACKGROUND OF INVENTION

1. Field of the Invention

The present invention relates to a vehicle, such as a pickup truck or sport utility vehicle, having a tailgate, or another type of door or closure panel mounted for rotation about a generally horizontal pivot axis.

2. Disclosure Information

Tailgates used with large pickup trucks and sport utility vehicles present a challenge to the motorist insofar as the weight of such tailgates and the height of such vehicles frequently results in the necessity of expending considerable effort to close the tailgate. If a torsion bar such as that disclosed U.S. Pat. No. 5,358,301, and which is illustrated in FIG. 5 of this specification is used, a problem may arise insofar as it becomes difficult to accurately and robustly set the side-to-side margins of the tailgate, while nevertheless allowing for removal and reinstallation of the tailgate. This problem stems from the requirement to position shims or spacers in the tailgate's main pivot mechanism. Shims are usually inserted in the pivot system under a bearing element. If, however, a fixed torsion bar is used, as with the '301 patent, the spacer could be lost because there is no provision for positive retention of a spacer. This problem may also occur with motor driven tailgates, because the drive mechanism will not, in most cases, be readily removable for the purpose of inserting a spacer at a pivot location.

A system according to the present invention solves the problem of accurately and robustly setting the side-to-side margins of a tailgate, especially for tailgates having the type of non-removable pivot hardware often found on tailgates or closure panels having torsion bar or motor driven lift assist.

SUMMARY OF INVENTION

According to the present invention, a closure panel for an automotive vehicle body includes a door adapted to rotate about a pivot axis, with the door having a shell including an outer panel joined with and spaced from an inner panel. A hinge half which is attached to a first end of the door shell is operatively engaged with a first pivot post which is adapted to be rigidly attached to an automotive body.

A closure panel according to the present invention further includes a hinge bearing retainer attached to a second end of the door and having a bearing insert housed therein, and a second pivot post adapted to be rigidly attached to the body, with the second pivot post engaging a bore formed in the bearing insert such that the second end of the door is supported upon the second pivot post. An axial locator member which is situated within the bearing insert bore and interposed between said second pivot post and an end wall of the bearing insert's bore establishes the margin between the second end of the door or closure panel and the vehicle body.

According to another aspect of the present invention, the axial locator member is mechanically engaged with a wall circumscribing an extended section of the bearing insert's bore.

The previously described second pivot post and bearing insert may be rotationally locked by providing a mating non-circular configuration for the bearing insert's bore, for the second pivot post, and for the axial locator.

A closure panel according to the present invention may further include a torsion bar for assisting movement of the closure panel from an open position to a closed position, with the torsion bar having a first end grounded to the closure panel and a second end rotationally locked to the bearing insert.

According to the present invention, the previously mentioned hinge half preferably includes a generally cylindrical cup attached to the first end of the door, with the cup having a generally cylindrical insert, and with at least one additional axial adjustment member disposed between the cup and the generally cylindrical insert. The installed thickness of each of the axial adjustment members may be selected so as to position the closure panel with approximately equal margins at each of the two ends of the closure panel.

According to another aspect of the present invention, a method for installing a hinged closure panel in an automotive vehicle includes the steps of setting a first panel margin by inserting an axial adjustment member between a generally cylindrical hinge insert and a hinge cup at a first end of a closure panel, followed by setting a second panel margin by seating an axial locator insert into the base of a bore located within a bearing insert retained upon a second end of a closure panel. Then, the bearing insert containing the axial locator insert will be telescopically engaged with a pivot post located upon the body of an automotive vehicle proximate the second end of the closure panel. Finally, the generally cylindrical hinge insert will be radially engaged with a pivot post located upon the automotive vehicle proximate the first end of the closure panel.

The bore of the bearing insert preferably has a non-circular configuration which is common with the configuration of the second axial adjustment member, as well as with the configuration of the pivot post which is located proximate the second end of the closure panel.

The axial adjustment member preferably comprises a circular disc having a thickness selected according to the total axial clearance between the closure panel and the body opening into which it is being installed, with the installed height of the axial locator insert also being selected according to at least the length of the closure panel.

Other advantages, as well as objects and features of the present invention, will become apparent to the reader of this specification.

DETAILED DESCRIPTION

Figure 1:
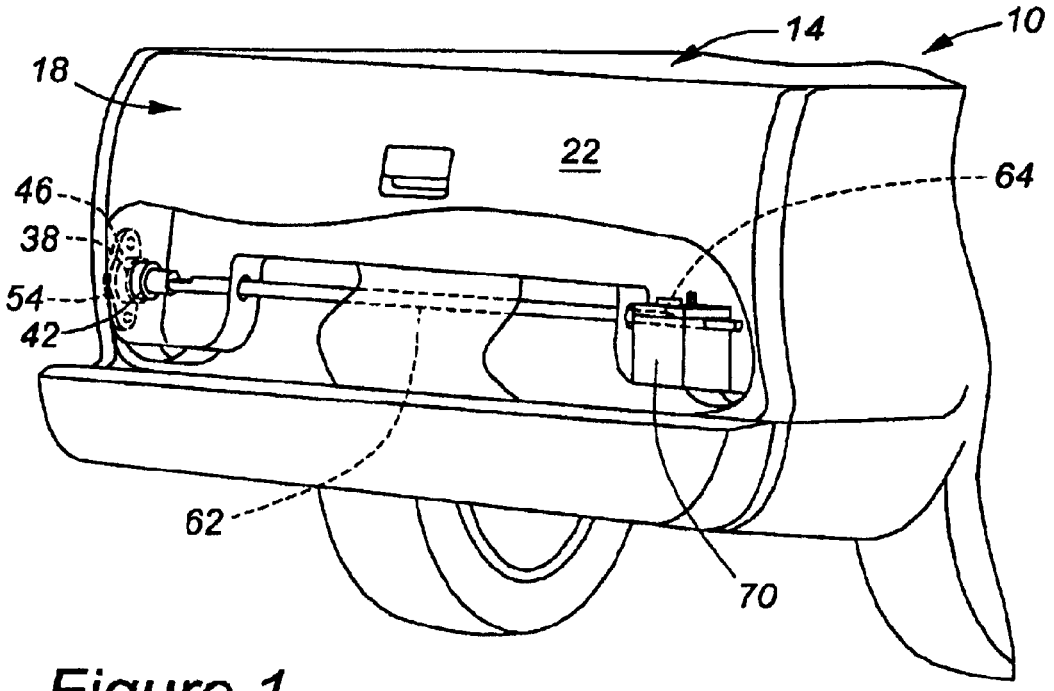
FIG. 1 is a partially cut away perspective view of a vehicle having a pivot-mounted alignment system according to the present invention.
Figure 2:
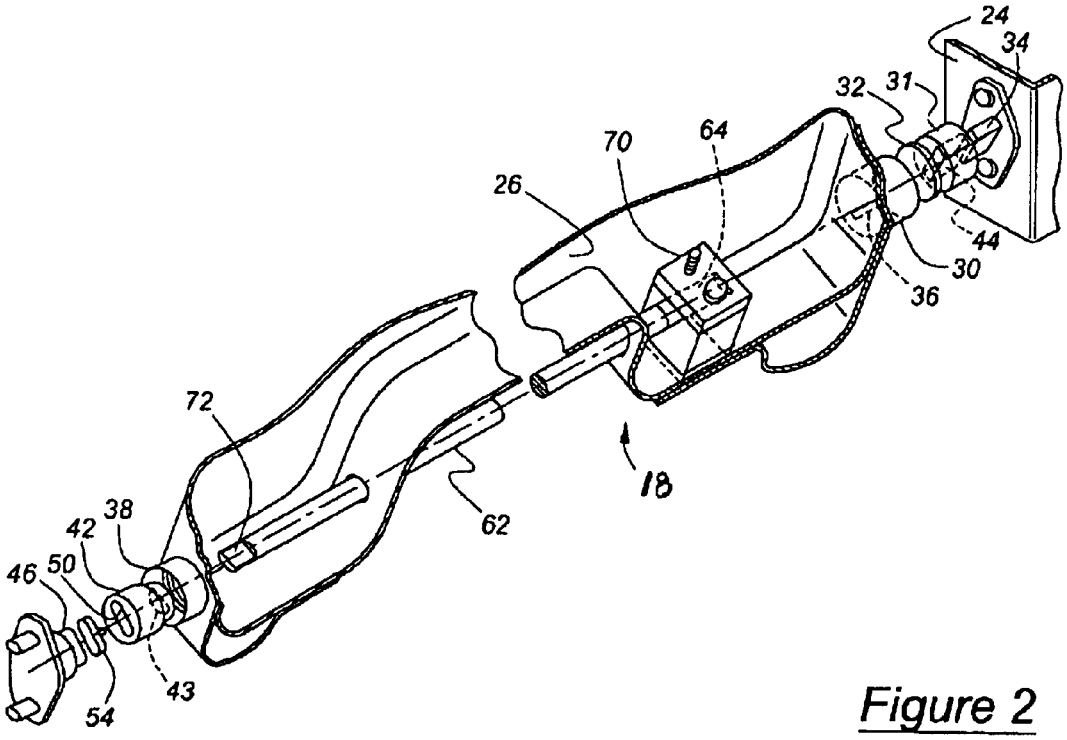
FIG. 2 is an exploded perspective showing the component parts of a closure panel alignment system according to the present invention.

As shown in the FIG. 1, vehicle 10 having load area 14 has a door 18, which in this case is a tailgate which rotates about a horizontal pivot axis. Door 18 has a shell including outer panel 22 and inner panel 26. Moving now to FIG. 2, door 18 has hinge half 30 which comprises a generally cylindrical cup attached to a first end of door 18. Generally cylindrical insert 31 is slidably inserted into hinge half 30 so as to retain axial adjustment member 32 within the space defined by hinge half 30 and insert 31. First pivot post 34 is attached to body 24 of vehicle 14 and is operably engaged with hinge half 30 by means of generally cylindrical insert 31. Generally cylindrical insert 31 has a slot 44 therein which matches a slot 36 formed in the outer periphery of hinge half 30, which allows tailgate 18 to be removed from vehicle 10 when tailgate 18 has been opened to a position at which slots 36 and 44 are lined up with the major axis of first pivot post 34. This orientation is generally shown in FIG. 2.

Hinge bearing retainer 38 is attached to a second end of door 18. Bearing insert 42 is housed in hinge bearing retainer 38. As is shown in FIG. 2, torsion bar 62 is used to assist the closing of door 18. Torsion bar 62 has a first end 64 which is captured by pinch block 70 which is mounted to the shell of tailgate 18, and a second end, 72, which is engaged with a non-circular bore, 43, formed in bearing insert 42 (FIGS. 2 and 3).

Figure 3:
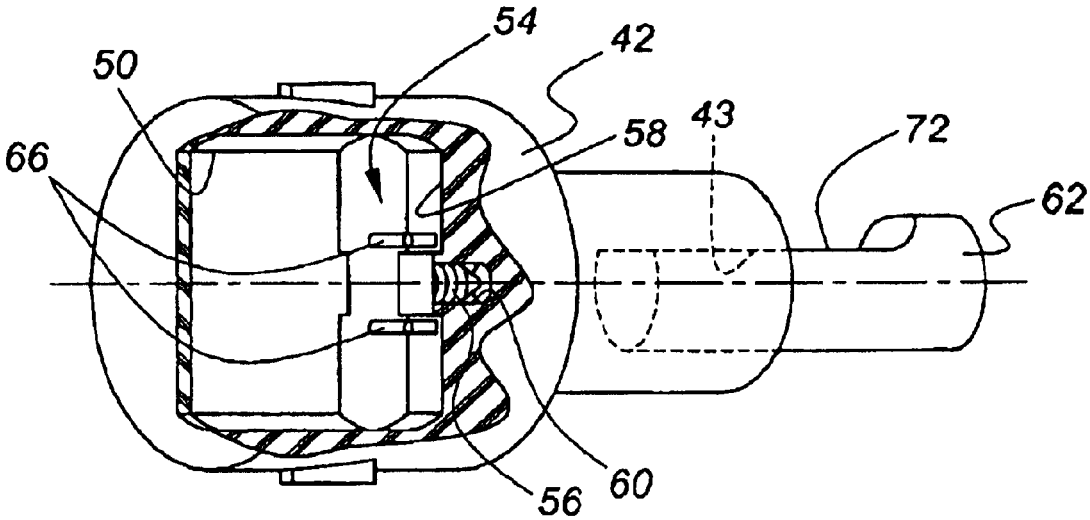
FIG. 3 is a partially cut away view of a bearing insert and axial locator insert according to the present invention.

FIG. 3 shows further details of bearing insert 42. For example, bearing insert 42 has a non-circular bore, 50, formed therein which engages second pivot post 46, which is attached to the body of vehicle 10 in the same manner as pivot post 34. In essence, bearing insert 42 and second pivot post 46 are rotationally locked so as to allow torsion bar 62 to assist the upward movement of door 18. Those skilled in the art will appreciate in view of this disclosure that the present invention could be employed with closure panels, including both doors and tailgates, and yet other types of closure panels, without the necessity of using either a torsion bar or motorized lift assist systems.

Once bearing insert 42 has been fitted onto second end 72 of torsion bar 62, either by press fitting or otherwise, and torsion bar 62 has been fastened into pinch block 70, the subassembly including torsion bar 62 and bearing insert 42 cannot be removed speedily during the assembly process of the vehicle for the purpose of placing an alignment shim or bushing into the hinge system. Instead, the side-to-side alignment problem is handled by axial locator insert 54 which is, as shown in FIGS. 1 and 2, placed within bore 50 formed in bearing insert 42. *Thus, an axial locator insert can be situated within the bearing insert bore and interposed between the second pivot post and an end wall 58 of the bore.*

Figure 4:
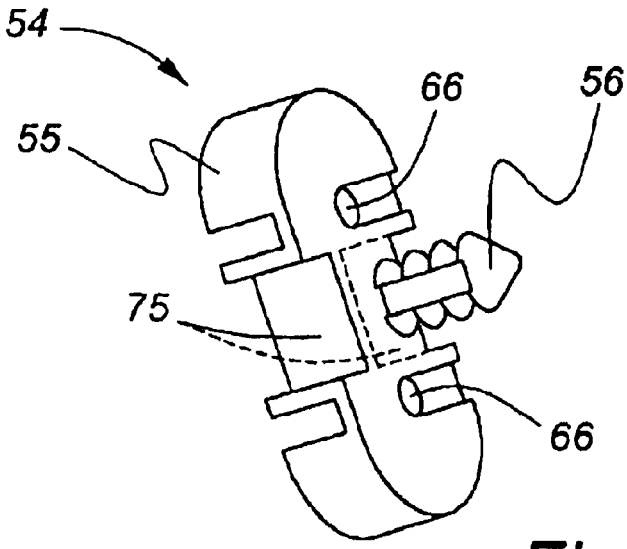
FIG. 4 is a perspective view of an axial locator insert according to the present invention.
Figure 5:
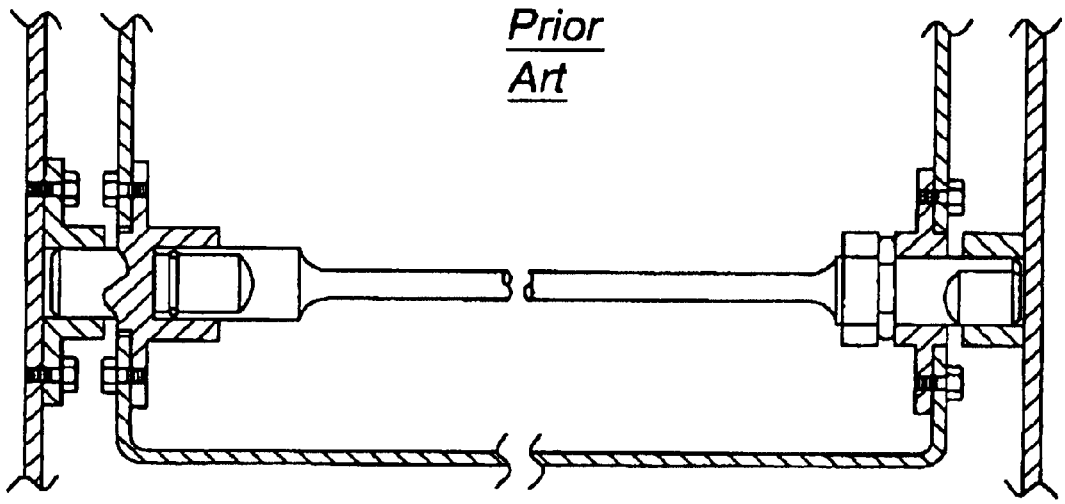
FIG. 5 illustrates a prior art torsion assist device for a vehicular tailgate.

As shown in FIG. 4, axial locator insert 54 has a flattened elongate body 55 which is pierced by two handling apertures 66. Axial locator insert 54 also has barbed extension 56 extending from one face of body 55. As shown in FIG. 3, extension 56 cooperates with cylindrical wall extension 60 of bearing insert 42 to retain axial locator insert 54 within bore 50. In use, axial locator insert 54 will be inserted by a fork (not shown) engaging apertures 66. Axial locator insert 54 may be made in a variety of thicknesses so as to place door 18 a desired distance away from second pivot post 46 and the adjoining portion of the vehicle's body. *Axial locator insert 54 also has barbed extension 56 extending from one face 75 of body 55.*

Once axial locator insert 54 has been placed within bore 50 such that barbed structure 56 grips the cylindrical wall of bore extension 60, tailgate 18 maybe removed without losing or misplacing axial locator insert 54. Moreover, once tailgate 18 has been placed upon vehicle 10, axial locator insert 54 will abut the inboard axial end of second pivot post 46, as may be seen particularly from FIG. 2, and as a result, door 18 will be restrained from moving closer than desired to the body of the vehicle. At the other end of door 18, axial adjustment member 32 is provided between generally cylindrical insert 31 and generally cylindrical hinge half 30.

According to another aspect of the present invention, a method for installing a hinged closure panel to an automotive vehicle includes the steps of setting a first panel margin for door 18 by inserting axial adjustment member 32, which is shown as being a disk-shape solid body between hinge half 30 and generally cylindrical hinge insert 31. Then, a second panel margin at the other end of door 18 is set by inserting an axial locator insert 54, having a desired thickness, into bore 50 within bearing insert 42. This is preferably done after bearing insert 42 is assembled to torsion bar 72 and torsion bar 72 is mounted within pinch block 70. Those skilled in the art will appreciate in view of this disclosure that it is possible, by maintaining a trend analysis of the lateral opening dimension of the illustrated pickup box, for example, to select an axial locator insert 54 having an appropriate installed height within bore 50 before tailgate or door 18 is even trial fit upon vehicle 10. This is other modifications of this process are within the scope of the claims of this specification.

Once axial adjustment member 32 and axial locator insert 54 have been installed, door 18 may be installed by first telescopically engaging bearing insert 42 with pivot post 46, and then by radially engaging generally cylindrical hinge insert 31 and the cup of hinge half 30 with pivot post 34. Once tailgate 18 has been installed, should further adjustment of the margin between tailgate 18 and the body of the vehicle be required, axial locator insert 54 maybe withdrawn from bore 50 of insert 42 by gripping axial locator insert 54 upon flattened areas 73 which are formed on the body 55 of axial locator insert 54.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A closure panel for an automotive vehicle body, comprising:

a door adapted to rotate about a pivot axis, with said door having a shell;

a hinge half attached to a first end of said door shell;

a first pivot post adapted to be rigidly attached to an automotive body and operatively engaged with said hinge half;

a hinge bearing retainer attached to a second end of said door and having a bearing insert housed therein;

a second pivot post adapted to be rigidly attached to said body, with said second pivot post engaging a bore formed in said bearing insert such that the second end of the door is supported upon said second pivot post; and an axial locator insert situated within said bearing insert bore and interposed between said second pivot post and an end wall of said bore.

2. A closure panel according to claim 1, wherein said axial locator insert is mechanically engaged with a wall circumscribing an extended section of said bore.

3. A closure panel according to claim 1, wherein said second pivot post and said bearing insert are rotationally locked.

4. A closure panel according to claim 1, wherein said bore in said bearing insert has a non-circular configuration, and said second pivot post and said axial locator insert have a common configuration allowing both the second pivot post and the axial locator insert to telescopically engage the bore of the bearing insert.

5. A closure panel according to claim 1, further comprising a torsion bar for assisting movement of said closure panel from an open position to a closed position, with said torsion bar having a first end grounded to said closure panel and a second end rotationally locked to said bearing insert.

6. A closure panel according to claim 1, wherein said hinge half comprises a generally cylindrical cup attached to said first end of said door, with said cup having a generally cylindrical insert, and with at least one axial adjustment member disposed between said cup and said insert.

7. A closure panel according to claim 6, wherein the installed thickness of said axial adjustment member and the installed thickness of said axial locator insert are selected so as to position said closure panel with approximately equal margins at each of the first and second ends of said closure panel.

8. A closure panel according to claim 1, wherein said axial locator insert comprises a flattened elongate body having a barbed extension for engaging a generally cylindrical wall extension formed in an end wall of said bearing insert bore.

9. A closure panel according to claim 8, wherein said axial locator insert further comprises a plurality of apertures formed in said flattened elongate body for the purpose of aiding the seating of said locator insert in said bore formed in said bearing insert.

10. A method for installing a hinged closure panel in an automotive vehicle, comprising the steps of:

setting a first panel margin by inserting an axial adjustment member between a hinge insert and a hinge cup at a first end of a closure panel;

setting a second panel margin by seating an axial locator insert into the base of a bore located within a bearing insert retained upon a second end of a closure panel;

telescopically engaging said bearing insert containing said second axial adjustment member with a pivot post located upon a body of an automotive vehicle proximate said second end of said panel; and radially engaging said generally cylindrical hinge insert, containing said axial locator insert, with a pivot post located upon said automotive vehicle proximate said first end of said panel.

11. A method according to claim 10, wherein said bore of said bearing insert has a non-circular configuration which is common with the configuration of said axial locator insert, as well as with the configuration of said pivot post which is located proximate the second end of said panel.

12. A method according to claim 10, wherein said axial adjustment member comprises a circular disc having a thickness selected according to at least the length of said panel, with the installed height of said axial locator insert also being selected according to at least the length of said panel.

13. A pivot-mounted alignment system for a closure panel of an automotive vehicle body, comprising:

a hinge half, comprising a cup-shaped structure having a base adapted for attachment to a first end of a door shell;

a first pivot post adapted to be rigidly attached to an automotive body and operatively engaged with said hinge half;

a hinge bearing retainer adapted to be attached to a second end of a door and having a generally cylindrical bearing insert housed therein;

a second pivot post adapted to be rigidly attached to said automotive body, with said second pivot post engaging a bore formed in said bearing insert such that the second end of the door is supported upon said second pivot post by said hinge bearing retainer and said bearing insert; and an axial locator insert situated within said bearing insert bore and interposed between said second pivot post and an end wall of said bore such that said axial locator insert establishes the minimum axial distance between said door and said automotive body.

14. A pivot-mounted alignment system according to claim 13, wherein said axial locator insert is mechanically engaged with a wall circumscribing an extended section of said bearing insert bore.

15. A pivot-mounted alignment system according to claim 13, wherein said second pivot post and said bearing insert are rotationally locked.

16. A pivot-mounted alignment system according to claim 13, wherein said bore in said bearing insert has a non-circular configuration, and said second pivot post and said axial locator insert have a common configuration allowing both the second pivot post and the axial locator insert to telescopically engage the bore of the bearing insert.

*17. A closure panel for an automotive vehicle body, comprising: a door adapted to rotate about a pivot axis, with said door having a shell; a hinge half attached to a first end of said door shell, the hinge half being adapted to operatively engage with a first pivot post that is rigidly attached to an automotive body; and a hinge bearing retainer attached to a second end of said door shell and having a bearing insert housed therein, where a bore is formed in said bearing insert, the bore being adapted to operatively engage with a second pivot post which is rigidly attached to said automotive body, such that the second end of the door is supported upon said second pivot post, the bore including an end wall and being further adapted to receive an axial locator situated and interposed between said second pivot post and said end wall of said bore.*

*18. The closure panel of claim 17, wherein the hinge half comprises a generally cylindrical cup.*

*19. The closure panel of claim 18, wherein an outer periphery of the hinge half includes a slot formed in the generally cylindrical cup.*

*20. The closure panel of claim 18, wherein the cylindrical cup is configured to receive a cylindrical insert.*

*21. The closure panel of claim 17, wherein the bore of the bearing insert is non-circular.*

*22. The closure panel of claim 17, wherein the bearing retainer comprises a generally cylindrical cup.*

*23. The closure panel of claim 22, wherein the bearing insert is generally cylindrical and is housed within the generally cylindrical cup of the bearing retainer.*

*24. The closure panel of claim 17, wherein an end wall of the bore includes a cylindrical wall extension for receiving and retaining a portion of the axial locator.*

*25. The closure panel of claim 17, further comprising a torsion bar disposed at least partially within the door shell for assisting an upward movement of the door.*

*26. The closure panel of claim 25, wherein a first end of the torsion bar is coupled to the door shell.*

*27. The closure panel of claim 26, wherein the first end of the torsion bar is coupled to the door shell by a pinch block.*

*28. The closure panel of claim 26, wherein a second end of the torsion bar is coupled to the bearing insert.*

*29. The closure panel of claim 28, wherein the second end of the torsion bar is non-circular and is fitted into a non-circular bore formed in the bearing insert.*

*30. The closure panel of claim 28, wherein the bearing insert is moveably coupled to the door shell by the torsion bar.*

*31. The closure panel of claim 28, wherein the torsion bar is substantially straight between the bearing insert and the door shell.*

* * * * *